(12) United States Patent
Kinoshita et al.

(10) Patent No.: US 11,719,153 B2
(45) Date of Patent: Aug. 8, 2023

(54) IGNITION DEVICE

(71) Applicant: DENSO CORPORATION, Kariya (JP)

(72) Inventors: Shota Kinoshita, Nisshin (JP); Akimitsu Sugiura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/732,317

(22) Filed: Apr. 28, 2022

(65) Prior Publication Data

US 2022/0251999 A1    Aug. 11, 2022

Related U.S. Application Data

(63) Continuation of application No. PCT/JP2020/039539, filed on Oct. 21, 2020.

(30) Foreign Application Priority Data

Oct. 30, 2019    (JP) .................................. 2019-197905

(51) Int. Cl.
*F02B 19/12* (2006.01)
*F02P 5/152* (2006.01)

(52) U.S. Cl.
CPC .............. *F02B 19/12* (2013.01); *F02P 5/152* (2013.01)

(58) Field of Classification Search
CPC .......... F02B 19/08; F02B 19/12; F02B 19/18; F02P 5/152; F02P 5/153
See application file for complete search history.

(56) References Cited

U.S. PATENT DOCUMENTS

| 2011/0259298 | A1* | 10/2011 | Imamura | ............ F02M 21/0284 |
| | | | | 123/436 |
| 2017/0074184 | A1* | 3/2017 | Kim | ........................ F02P 15/08 |
| 2018/0372055 | A1* | 12/2018 | Hirayama | ............. F02B 19/108 |
| 2019/0078498 | A1* | 3/2019 | Bedogni | ............. F02B 19/1019 |

FOREIGN PATENT DOCUMENTS

| JP | 58-154869 | 10/1983 |
| JP | 2009-36157 | 2/2009 |
| JP | 2015-190338 | 11/2015 |
| JP | 2018-178966 | 11/2018 |

\* cited by examiner

*Primary Examiner* — Scott A Reinbold
*Assistant Examiner* — Anthony L Bacon
(74) *Attorney, Agent, or Firm* — Nixon & Vanderhye P.C.

(57) ABSTRACT

An ignition device of the present embodiment is an ignition device for an internal combustion and includes an ignition plug, an operating information acquisition unit and an ignition control unit. The ignition plug includes an accessory chamber and an injection hole from which flame is to be injected from the accessory chamber to a main combustion chamber. The operating information acquisition unit is configured to acquire operating information regarding an operating state of the internal combustion. The ignition control unit is configured to control an ignition energy profile that affects an ignition state of an air-fuel mixture based on the operating information acquired by the operating information acquisition unit.

18 Claims, 12 Drawing Sheets

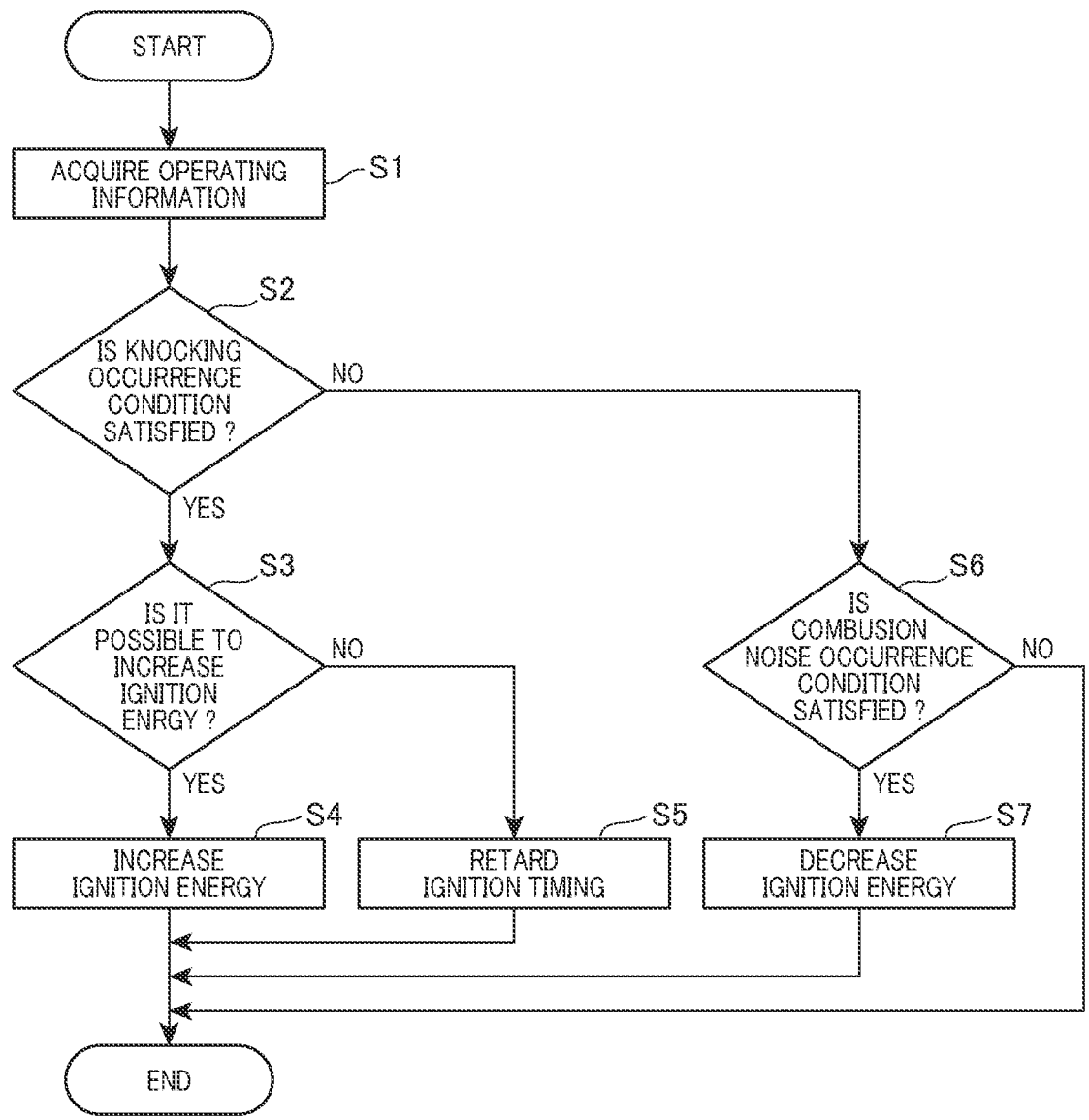

FIG.9A 25mJ
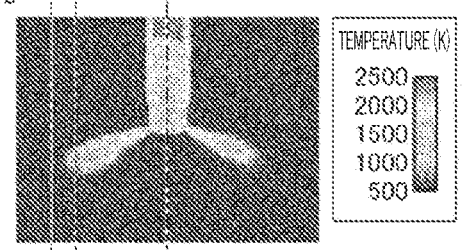
FIG.9B 50mJ
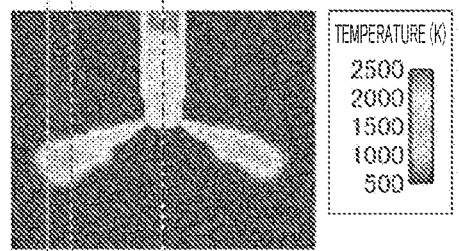
FIG.9C 100mJ
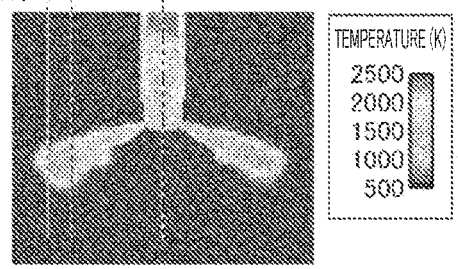

SWITCHING CONTROL OF CIRCUIT TO BE USED

CONTROL OF THE NUMBER OF TIMES OF DISCHARGE UPON A PLURALITY OF TIMES OF DISCHARGE

CONTROL OF DISCHARGE CURRENT

CONTROL OF DISCHARGE PERIOD

CONTROL OF DISCHARGE TIMING

IGNITION DEVICE

CROSS-REFERENCE TO RELATED APPLICATION

The present application is a continuation application of International Application No. PCT/JP2020/039539, filed on Oct. 21, 2020, which claims priority to Japanese Patent Application No. 2019-197905, filed on Oct. 30, 2019. The contents of these applications are incorporated herein by reference in their entirety.

BACKGROUND

Technical Field

The present disclosure relates to an ignition device.

Background Art

There is an ignition device that injects flame from an accessory chamber to a main combustion chamber as an ignition device of an internal combustion. As such an ignition device, for example, a configuration including a pressure sensor that detects a pressure within the accessory chamber is disclosed. In this configuration, variation in ignition timing in the main combustion chamber is reduced by adjusting an ignition timing in accordance with an operating state of the internal combustion and the pressure within the accessory chamber detected by the pressure sensor and correcting the ignition timing based on a shape of the accessory chamber including a volume of the accessory chamber, the number of injection holes and a radius of the injection hole. Further, a configuration that dynamically corrects an ignition timing by feedback control for preventing occurrence of knocking due to degradation over time, or the like, of the ignition device is also disclosed.

SUMMARY

In the present disclosure, provided is an ignition device for an internal combustion as the following.

The ignition device includes an ignition plug including an accessory chamber and an injection hole from which flame is to be injected from the accessory chamber to a main combustion chamber; an operating information acquisition unit configured to acquire operating information regarding an operating state of the internal combustion; and an ignition control unit configured to control an ignition energy profile that affects an ignition state of an air-fuel mixture based on the operating information acquired by the operating information acquisition unit.

BRIEF DESCRIPTION OF THE DRAWINGS

The above and other objects, features and advantages of the present disclosure will become more clear from the following detailed description with reference to the accompanying drawings, in which

FIG. 7 is a view illustrating control flow of the ignition device in the first embodiment.

FIG. 9A to FIG. 9C are views illustrating results of an evaluation test in the first embodiment.

DETAILED DESCRIPTION OF THE PREFERRED EMBODIMENTS

[PTL 1] JP 2018-178966 A

Figure 1:
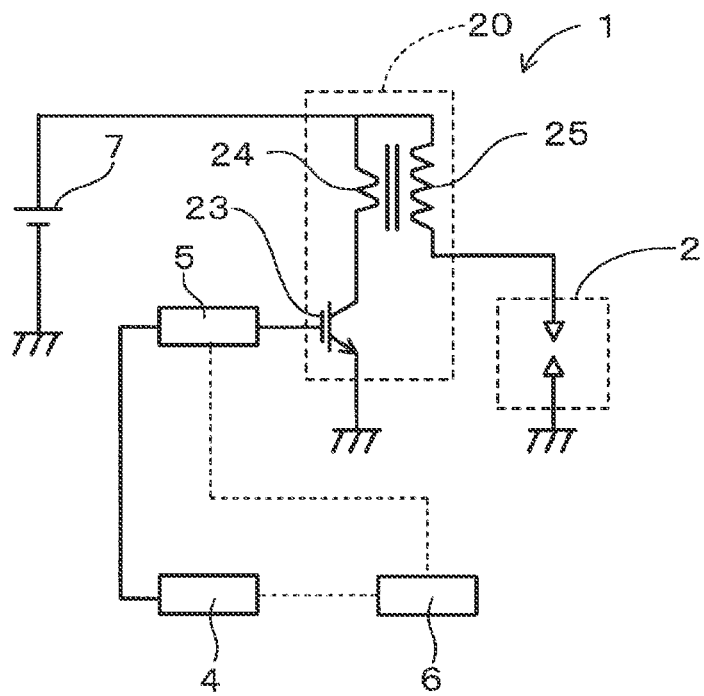
FIG. 1 is a conceptual diagram illustrating a configuration of an ignition device in a first embodiment.

In an ignition device including an accessory chamber, data regarding injection speed, a length, or the like, of flame to be injected from injection holes automatically changes in accordance with operating conditions such as a load and rotation speed of an internal combustion as well as a volume of the accessory chamber and a radius of the injection hole. On the other hand, data regarding flame to be injected such as the volume of the accessory chamber and the number of injection holes is set so that an ideal flame is injected in a certain condition, and thus, it is difficult with these kinds of data to cause an ideal flame to be injected over a wide operating range, so that heat efficiency decreases and fuel efficiency degrades in most of the operating range.

Further, in a high-load region, if an uncombusted air-fuel mixture remains at a bore end that is a peripheral portion within a main combustion chamber, knocking is likely to occur. Further, to prevent occurrence of such knocking, it is effective to increase injection speed of flame to be injected from the injection holes to cause the injected flame to instantaneously reach the bore end before knocking occurs so that the air-fuel mixture is combusted. On the other hand, if the injection speed of flame is excessively increased, combustion noise occurs by pressure propagation, which may be erroneously recognized as occurrence of knocking by a knocking sensor that detects oscillation of combustion.

If occurrence of knocking is erroneously recognized, an ignition timing is automatically retarded based on a control value, which results in degradation of fuel efficiency. Further, combustion noise is an unpleasant sound for a user, and thus it is desired to prevent occurrence of combustion noise. Consequently, to improve fuel efficiency of the internal combustion, simple increase of injection speed of injected flame is not sufficient, and there is room for improvement.

The present disclosure is directed to providing an ignition device that can achieve improvement in fuel efficiency.

A first aspect of the present disclosure is an ignition device for an internal combustion, the ignition device including:

an ignition plug including an accessory chamber and an injection hole from which flame is to be injected from the accessory chamber to a main combustion chamber;

an operating information acquisition unit configured to acquire operating information regarding an operating state of the internal combustion; and an ignition control unit configured to control an ignition energy profile that affects an ignition state of an air-fuel mixture based on the operating information acquired by the operating information acquisition unit, wherein the ignition control unit is configured to:

compare a predetermined target load with a load acquired by the operating information acquisition unit, decrease ignition energy to be supplied to the ignition plug, in response to a result of the comparison indicating that the acquired load is higher than the target load, and increase ignition energy to be supplied to the ignition plug, in response to the result of the comparison indicating that the acquired load is lower than the target load.

A second aspect of the present disclosure is an ignition device for an internal combustion, the ignition device including:

an ignition plug including an accessory chamber and an injection hole from which flame is to be injected from the accessory chamber to a main combustion chamber;

an operating information acquisition unit configured to acquire operating information regarding an operating state of the internal combustion; and an ignition control unit configured to control an ignition energy profile that affects an ignition state of an air-fuel mixture based on the operating information acquired by the operating information acquisition unit, wherein the ignition control unit is configured to:

determine whether a knocking occurrence condition is satisfied, and increase ignition energy to be supplied to the ignition plug, in response to determining that the knocking occurrence condition is satisfied.

A third aspect of the present disclosure is an ignition device for an internal combustion, the ignition device including:

an ignition plug including an accessory chamber and an injection hole from which flame is to be injected from the accessory chamber to a main combustion chamber;

an operating information acquisition unit configured to acquire operating information regarding an operating state of the internal combustion; and an ignition control unit configured to control an ignition energy profile that affects an ignition state of an air-fuel mixture based on the operating information acquired by the operating information acquisition unit, wherein the ignition control unit is configured to:

determine whether the operating state satisfies a knocking occurrence condition, determine whether it is possible to prevent knocking by increasing ignition energy to be supplied to the ignition plug, in response to determining that the knocking occurrence condition is satisfied, and retard an ignition timing, in response to determining that it is not possible to prevent the knocking.

The ignition device in the above-described aspect is configured so that the ignition energy profile that affects the ignition state of the air-fuel mixture is controlled based on the operating information. Thus, even if an operating state changes, the ignition energy profile is controlled in accordance with the operating state, so that it is possible to cause flame to be injected from the injection holes of the accessory chamber at an optimal injection speed and optimal length. It is therefore possible to prevent occurrence of knocking by increasing injection speed of flame in a high-load region, prevent the injection speed of the flame from being excessively increased, and prevent erroneous recognition of occurrence of knocking based on combustion noise. According to these, it is possible to achieve both prevention of occurrence of knocking and prevention of combustion noise and achieve improvement in fuel efficiency.

As described above, according to the above-described aspect, it is possible to provide an ignition device that can achieve improvement in fuel efficiency.

Note that reference numerals in brackets recited in the claims indicate correspondence relationships with specific means described in embodiments which will be described later and do not limit a technical scope of the present disclosure.

First Embodiment

Embodiments of the above-described ignition device will be described using FIG. 1 to FIG. 8.

Figure 2:
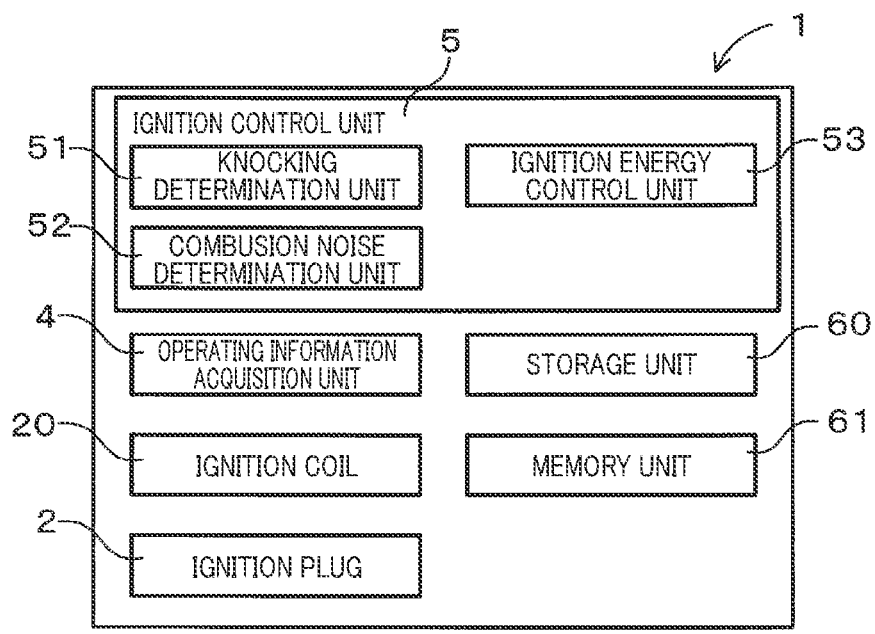
FIG. 2 is a block diagram illustrating the configuration of the ignition device in the first embodiment.

An ignition device 1 in the present embodiment is an ignition device for an internal combustion as illustrated in FIG. 1 and includes an ignition plug 2, an operating information acquisition unit 4 and an ignition control unit 5 as illustrated in FIG. 2.

The ignition plug 2 includes an accessory chamber 21 and injection holes 22 from which flame is to be injected from the accessory chamber 21 to a main combustion chamber 3 as illustrated in FIG. 3.

The operating information acquisition unit 4 illustrated in FIG. 1 and FIG. 2 acquires operating information regarding an operating state of the internal combustion.

The ignition control unit 5 controls an ignition energy profile that affects an ignition state of an air-fuel mixture based on the operating information acquired by the operating information acquisition unit 4.

The ignition device 1 of the present embodiment will be described in detail below.

As illustrated in FIG. 3, in the ignition device 1 of the present embodiment, the ignition plug 2 is attached to a cylinder head 101 of the internal combustion so that a tip of the ignition plug 2 is exposed to the main combustion chamber 3 of the internal combustion. As illustrated in FIG. 3, the accessory chamber 21 is provided at the tip of the ignition plug 2. A discharge gap G is formed within the accessory chamber 21, and a plurality of injection holes 22 that allow the accessory chamber 21 to communicate with the main combustion chamber 3 are formed at a wall portion that forms the accessory chamber 21. Note that while in the present embodiment, the wall portion that forms the accessory chamber 21 is formed separately from a housing of the ignition plug 2, the wall portion and the housing of the ignition plug 2 may be integrally formed as one part. Further, the wall portion that forms the accessory chamber 21 may be formed integrally with the cylinder head 101.

Figure 3A:
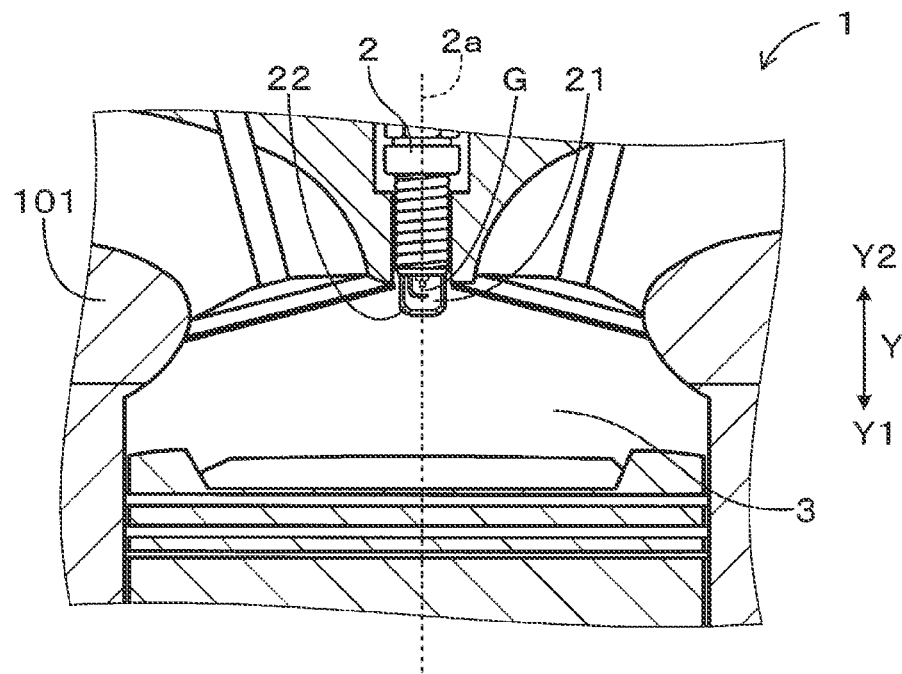
FIG. 3A is a conceptual cross-sectional diagram illustrating a configuration of an ignition plug.
Figure 3B:
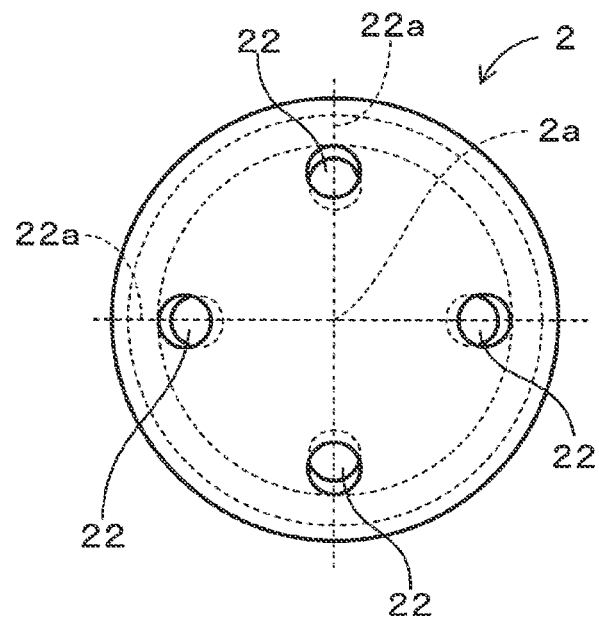
FIG. 3B is a bottom view of the ignition plug in the first embodiment.
Figure 4A:
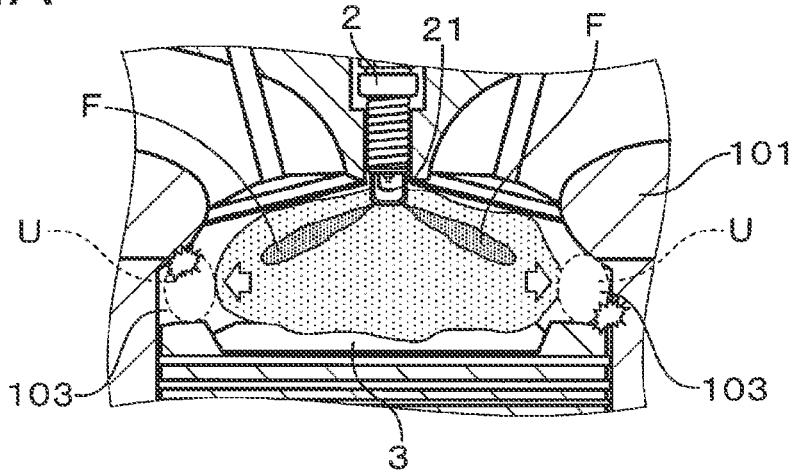
FIG. 4A to FIG. 4C are conceptual diagrams illustrating injection aspects of flame in the first embodiment.
Figure 4B:
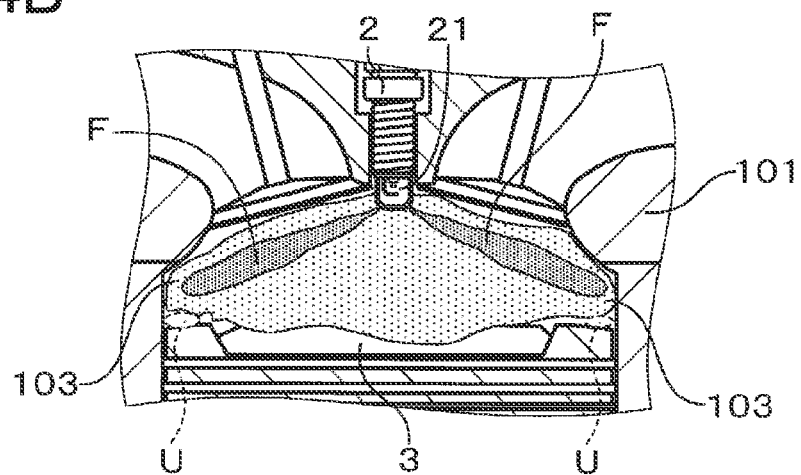

As illustrated in FIG. 3A and FIG. 3B, the accessory chamber 21 communicates with the main combustion chamber 3 via a plurality of injection holes 22. A shape of the injection hole 22 is not particularly limited, and arrangement of the injection holes 22 is not limited. In the present embodiment, as illustrated in FIG. 3B, the injection holes 22 are concentrically arranged around a plug shaft center 2a of the ignition plug 2 when the ignition plug 2 is viewed from a tip side Y1 to a base end side Y2. A center line 22a of the injection hole 22 extends so as to be separated from the plug shaft center 2a from the accessory chamber 21 toward the main combustion chamber 3. In the present embodiment, data such as a shape of the accessory chamber 21, a radius, arrangement, or the like, of the injection holes 22 are set so that flame is injected from the injection holes 22 to a bore end 103 within the main combustion chamber 3 as illustrated in FIG. 4B.

Figure 4C:
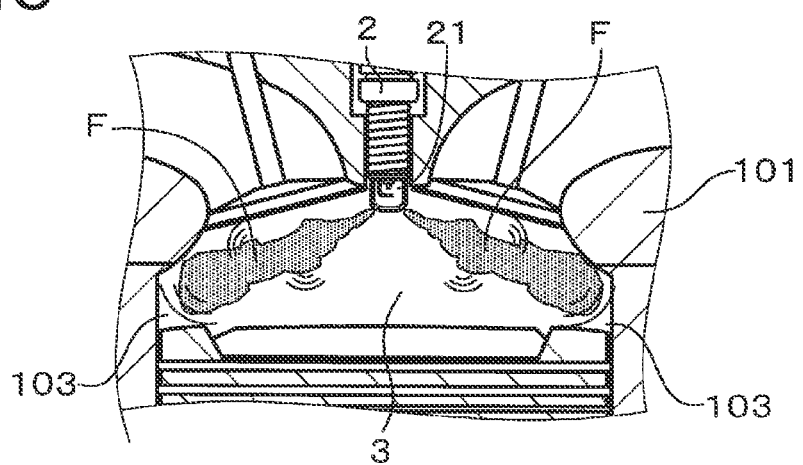
Figure 5A:
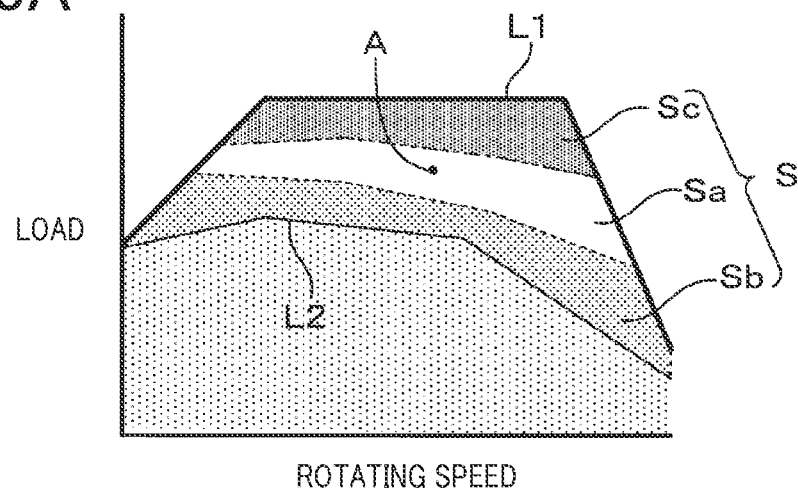
FIG. 5A to FIG. 5C are conceptual diagrams indicating a correspondence relationship among a load, rotation speed and an ignition energy profile in the first embodiment.

As illustrated in FIG. 5A, an engine operating region can be expressed as a relationship between rotation speed and a load of an engine, and an upper limit of the engine operating region can be indicated as a reference L1. Further, in the engine operating region, in a high-load region S on a higher load side than a reference L2, there is a possibility that knocking may occur if ignition is performed at an ignition timing at which the best fuel efficiency can be obtained. As illustrated in FIG. 4A, the knocking is caused as a result of an uncombusted air-fuel mixture U existing at the bore end 103 reaching self-ignition by being compressed by a combusted gas in a case where injection speed of flame F to be injected from the accessory chamber 21 is slow and the flame F does not reach the bore end 103 within the main combustion chamber 3. On the other hand, in a case where the injection speed of the flame F is excessively high, as illustrated in FIG. 4C, there is a possibility that a compressional wave generated by adiabatic compression as a result of jetting of the flame F may propagate within the main combustion chamber 3 and generate combustion noise. To address these, by adjusting the injection speed of the flame by setting data regarding the shape of the accessory chamber 21, and the radius, arrangement, or the like, of the injection holes 22 as described above in a predetermined operating condition, as illustrated in FIG. 4B, knocking is prevented by causing the flame to reach the bore end 103, and combustion noise is reduced within an allowable range. In the present embodiment, as illustrated in FIG. 5A, the above-described data is set based on an operating condition at a point A, and thus, knocking is prevented and combustion noise is reduced within an allowable range in a first high-load region Sa including the point A among the high-load region S.

The operating information acquisition unit 4 illustrated in FIG. 1 acquires operating information regarding an operating state in an internal combustion of a vehicle on which the ignition device 1 of the first embodiment is mounted. Examples of the operating information can include, for example, a load, rotation speed, an in-cylinder pressure, and the like, in the internal combustion. Such operating information can be acquired from, for example, an ECU 6 that is a control unit of the internal combustion. The operating information acquired by the operating information acquisition unit 4 is stored in a storage unit 60 illustrated in FIG. 2.

As illustrated in FIG. 2, the ignition control unit 5 includes a knocking determination unit 51, a combustion noise determination unit 52 and an ignition energy control unit 53. The knocking determination unit 51 determines whether a condition that knocking occurs is satisfied in the internal combustion or whether knocking is occurring based on the operating information acquired by the operating information acquisition unit 4. The condition that knocking occurs is stored in advance in a memory unit 61. The condition that knocking occurs can include a condition that a load is lower than a predetermined target load. In the present embodiment, as illustrated in FIG. 5A, the first high-load region Sa is set as a target load, and the condition that knocking occurs is a condition that the load belongs to a second high-load region Sb lower than the target load.

Further, the combustion noise determination unit 52 determines whether a condition that combustion noise of equal to or greater than a predetermined reference occurs is satisfied in the internal combustion or whether combustion noise is occurring based on the operating information acquired by the operating information acquisition unit 4. The condition that combustion noise occurs is stored in advance in the memory unit 61. The condition that combustion noise occurs can include a condition that a load is higher than a predetermined target load. In the present embodiment, as illustrated in FIG. 5A, the first high-load region Sa is set as a target load, and the condition that combustion noise occurs is a condition that the load belongs to a third high-load region Sc higher than the target load. Further, the condition that combustion noise occurs may include a condition that pressure oscillation occurring in association with injection of flame from the injection holes 22 is greater than a predetermined reference value.

Figure 6A:
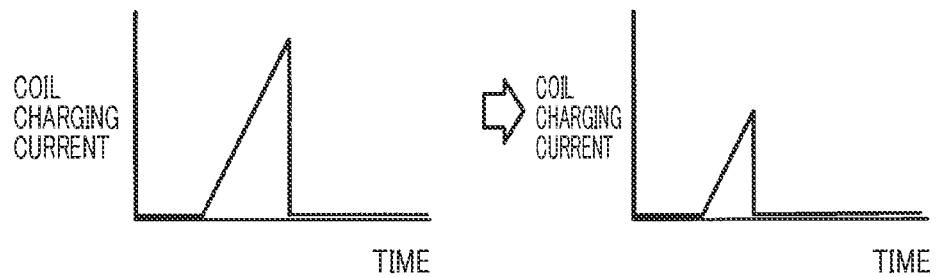
FIG. 6A to FIG. 6B are conceptual diagrams illustrating a control aspect of the ignition energy profile in the first embodiment.
Figure 6B:
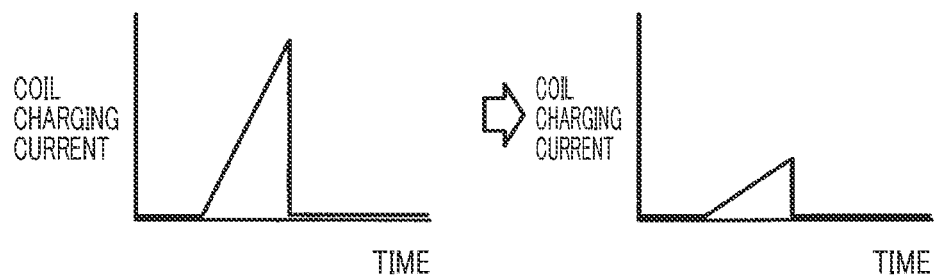

The ignition energy control unit 53 illustrated in FIG. 2 controls the ignition energy profile based on a determination result of the knocking determination unit 51 or the combustion noise determination unit 52. The ignition energy profile is an element that affects an ignition state of an air-fuel mixture and can include, for example, a discharge current value at the ignition plug 2 illustrated in FIG. 1, the number of times and a period while the discharge current is made to flow, and further, a coil charging period and a coil discharge period at an ignition coil 20 including a primary coil 24 and a secondary coil 25, an aspect where a coil circuit is switched in a case where the ignition coil 20 includes a plurality of coil circuits, an ignition timing, and the like. In the present embodiment, the ignition energy control unit 53 controls operation of an igniter 23 including a switch element provided at the ignition coil 20. The ignition energy control unit 53 controls ignition energy to be supplied to the ignition plug 2 as the ignition energy profile by control of ON/OFF of the igniter 23. For example, as illustrated in FIG. 6A, the ignition energy to be supplied to the ignition plug 2 can be reduced by shortening an ON period of the igniter 23 to shorten a charging period to the ignition coil 20. Further, while not illustrated, the ignition energy to be supplied to the ignition plug 2 can be increased by lengthening the charging period. Further, as illustrated in FIG. 6B, the ignition energy to be supplied to the ignition plug 2 can be reduced by lowering a charging voltage to the ignition plug 20. Further, while not illustrated, the ignition energy to be supplied to the ignition plug 2 can be increased by increasing the charging voltage.

The ignition energy control unit 53 can control the ignition energy profile, for example, based on a correspondence relationship between the operating information and the ignition energy profile set in advance. The correspondence relationship can be expressed as a form of a map of the ignition energy profile with respect to the operating information, as an expression that derives a relationship between the operating information and the ignition energy profile from a theoretic model or as a relational expression obtained from a physical model by an acceleration test. In the present embodiment, the ignition energy control unit 53 controls the ignition energy profile based on a map indicating the correspondence relationship among a load, rotation speed and the ignition energy profile illustrated in FIG. 5B. The map is stored in advance in the memory unit 61.

Control flow of the ignition device 1 in the present embodiment will be described below.

First, in step S1 illustrated in FIG. 7, the operating information of the internal combustion is acquired by the operating information acquisition unit 4 and is stored in the storage unit. Then, in step S2 illustrated in FIG. 7, the knocking determination unit 51 determines whether a knocking occurrence condition is satisfied based on the operating information acquired by the operating information acquisition unit 4. In the present first embodiment, the knocking determination unit 51 determines whether the load acquired by the operating information acquisition unit 4 belongs to the second high-load region Sb that is lower than the first high-load region Sa as the target load illustrated in FIG. 5A.

In a case where it is determined in step S2 illustrated in FIG. 7 that the knocking occurrence condition is satisfied, that is, in a case where it is determined that the load belongs to the second high-load region Sb, the processing proceeds to Yes in step S2. Then, in step S3, it is determined whether the ignition energy to the ignition plug 2 can be increased. The determination can be performed by the combustion noise determination unit 52 determining whether a combustion noise occurrence condition is satisfied. In the present first embodiment, the operating information acquisition unit 4 acquires pressure oscillation occurring in association with injection of flame from the injection holes 22, and the combustion noise determination unit 52 compares the pressure oscillation with a predetermined set value to determine whether the pressure oscillation is equal to or greater than the set value.

Figure 5B:
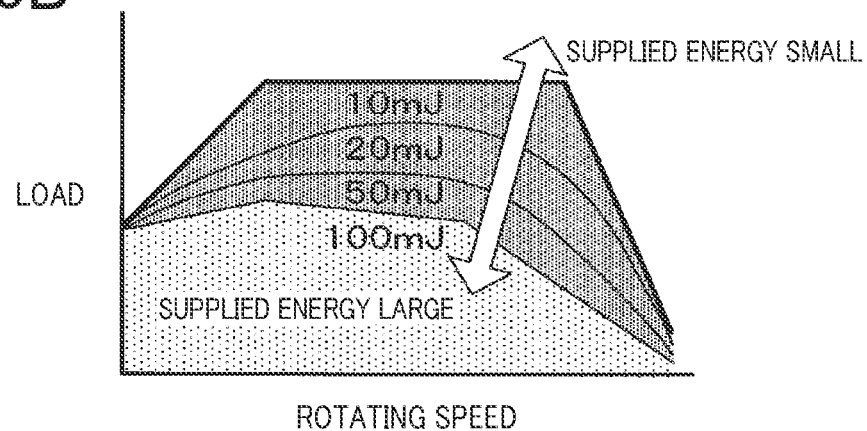
Figure 5C:
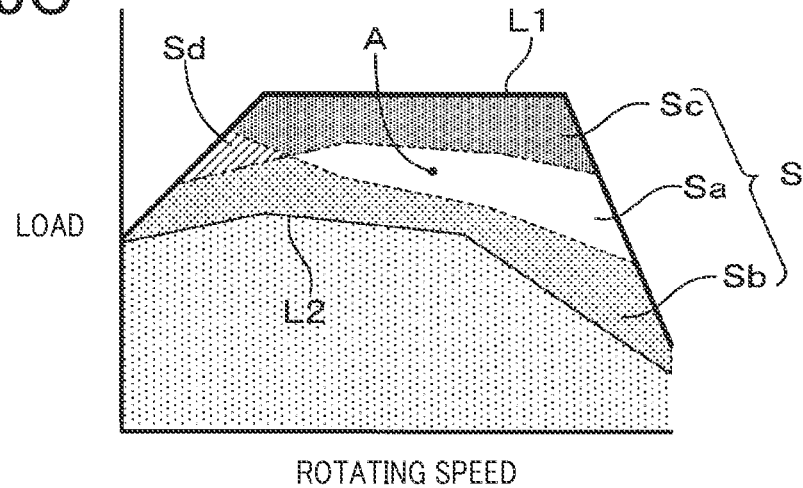

In in a case where it is determined in step S3 illustrated in FIG. 7 that the pressure oscillation is not equal to or greater than the set value, it is determined that the ignition energy can be increased, and the processing proceeds to No in step S3. Then, in step S4, the ignition energy to be supplied to the ignition plug 2 is increased by the ignition energy control unit 53, and the control is finished. For example, as illustrated in FIG. 5B, the ignition energy to be supplied to the ignition plug 2 is increased based on the map indicating the correspondence relationship among the load, the rotation speed and the ignition energy profile. By this means, it is possible to cause the flame F to reach the bore end 103 as illustrated in FIG. 4B by increasing the injection speed of the flame F from relatively low speed as illustrated in FIG. 4A. As a result of this, the uncombusted air-fuel mixture U at the bore end 103 is reduced, so that occurrence of knocking is prevented.

On the other hand, there is a case where it is determined in step S3 illustrated in FIG. 7 that the pressure oscillation is equal to or greater than the set value. In other words, there is a case where the engine operating region has a fourth high-load region Sd illustrated in FIG. 5C depending on an engine. In the fourth high-load region Sd, while the acquired operating information satisfies the knocking occurrence condition, the acquired operating information also satisfies a combustion noise occurrence condition in which combustion noise exceeds an allowable range. Thus, in a case where it is determined in step S3 that the load belongs to the fourth high-load region Sd, although it is desired to increase the injection speed of the flame to prevent knocking, the injection speed of the flame has already exceeded the allowable range of combustion noise, and thus, it is determined that the ignition energy cannot be increased, and the processing proceeds to No in step S3. Then, in step S5, the ignition energy control unit 53 retards the ignition timing to prevent occurrence of knocking, and the control is finished.

Further, in a case where it is determined in step S2 illustrated in FIG. 7 that the knocking occurrence condition is not satisfied, the processing proceeds to No in step S2. Then, in step S6, the combustion noise determination unit 52 determines whether the combustion noise occurrence condition is satisfied based on the operating information acquired by the operating information acquisition unit 4. In the present first embodiment, it is determined whether the load acquired by the operating information acquisition unit 4 belongs to the third high-load region Sc that is higher than the first high-load region Sa as the target load illustrated in FIG. 5A. In a case where it is determined in step S6 that the combustion noise occurrence condition is not satisfied, the processing proceeds to No in step S6, and the control is finished.

On the other hand, in a case where it is determined in step S6 illustrated in FIG. 7 that the combustion noise occurrence condition is satisfied, that is, in a case where it is determined that the load belongs to the third high-load region Sc, the processing proceeds to Yes in step S6. Then, in step S7, the ignition energy control unit 53 reduces the ignition energy to be supplied to the ignition plug 2, and the control is finished. By this means, the combustion noise is reduced within the allowable range by decreasing the injection speed of the flame F from excessively high speed as illustrated in FIG. 4C to speed at which the flame F reaches the bore end 103 as illustrated in FIG. 4B.

Operational effects of the ignition device 1 of the internal combustion in the present embodiment will be described in detail next.

The ignition device 1 of the internal combustion in the present first embodiment controls the ignition energy profile that affects the ignition state of the air-fuel mixture based on the operating information. Thus, even if the operating state changes, the flame can be caused to be injected from the injection holes 22 of the accessory chamber 21 at optimal injection speed and optimal length by controlling the ignition energy profile in accordance with the operating state. Thus, occurrence of knocking is prevented by increasing the injection speed of the flame in the high-load region, and erroneous recognition of occurrence of knocking based on combustion noise is prevented by preventing excessive increase of the injection speed of the flame. By this means, both prevention of occurrence of knocking and prevention of combustion noise are achieved, so that fuel efficiency is improved.

Further, in the present first embodiment, the ignition energy profile includes the ignition energy to be supplied to the ignition plug 2. This can control the injection speed of the flame at the ignition plug 2 with high accuracy, so that both prevention of occurrence of knocking and prevention of combustion noise are achieved, so that fuel efficiency is further improved.

Further, in the present first embodiment, the operating information includes at least one of the load and the rotation speed in the internal combustion. By this means, the ignition energy profile is controlled in accordance with the load and the rotation speed of the internal combustion, which makes it easier to adapt the injection speed of the flame to the operating state even in a case where the injection speed of the flame automatically changes, so that fuel efficiency is further improved.

Further, in the present first embodiment, the ignition control unit 5 compares the load acquired by the operating information acquisition unit 4 with the predetermined target load, and in a case where the comparison result indicates that the acquired load is higher than the target load, reduces the ignition energy to be supplied to the ignition plug 2. Then, in a case where the above-described comparison result indicates that the acquired load is lower than the target load, the ignition control unit 5 increases the ignition energy to be supplied to the ignition plug 2. This makes it possible to prevent occurrence of combustion noise by decreasing the injection speed of the flame in a condition where combustion noise is likely to occur and prevent occurrence of knocking by increasing the injection speed of the flame in a condition where knocking is likely to occur.

Further, in the present first embodiment, the ignition control unit 5 determines whether pressure oscillation occurring in association with injection of the flame from the injection holes 22 satisfies the combustion noise occurrence condition, and in a case where it is determined that the combustion noise occurrence condition is satisfied, reduces the ignition energy to be supplied to the ignition plug 2. This makes it possible to prevent occurrence of combustion noise with high accuracy.

Further, in the present first embodiment, the ignition control unit 5 determines whether the knocking occurrence condition is satisfied, and in a case where it is determined that the knocking occurrence condition is satisfied, increases the ignition energy to be supplied to the ignition plug 2. This makes it possible to prevent occurrence of knocking with high accuracy.

Further, in the present first embodiment, the ignition control unit 5 determines whether the operating state satisfies the knocking occurrence condition, and in a case where it is determined that the knocking occurrence condition is satisfied, determines whether knocking can be prevented by increasing the ignition energy to be supplied to the ignition plug 2. Then, in a case where it is determined that knocking cannot be prevented, the ignition control unit 5 retards the ignition timing. By this means, in a case where knocking cannot be prevented by increasing the ignition energy to be supplied to the ignition plug 2, it is possible to prevent knocking without increasing combustion noise, by retarding the ignition timing.

Figure 8A:
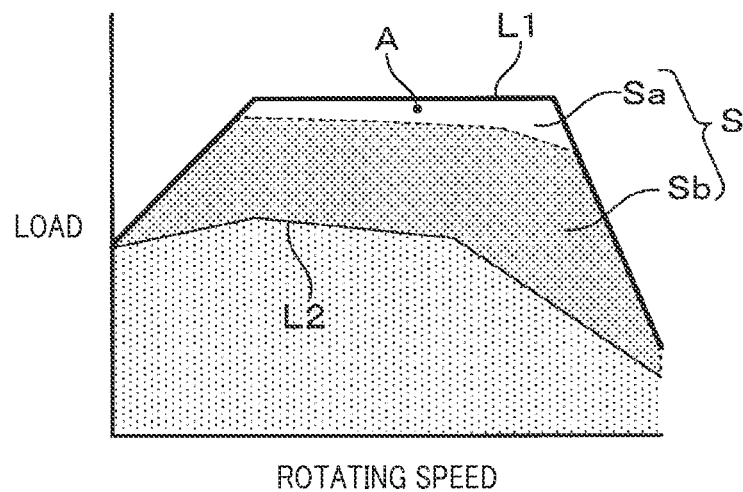
FIG. 8A is a conceptual diagram indicating a correspondence relationship among a load, rotation speed and an ignition energy profile in a first modified example.
Figure 8B:
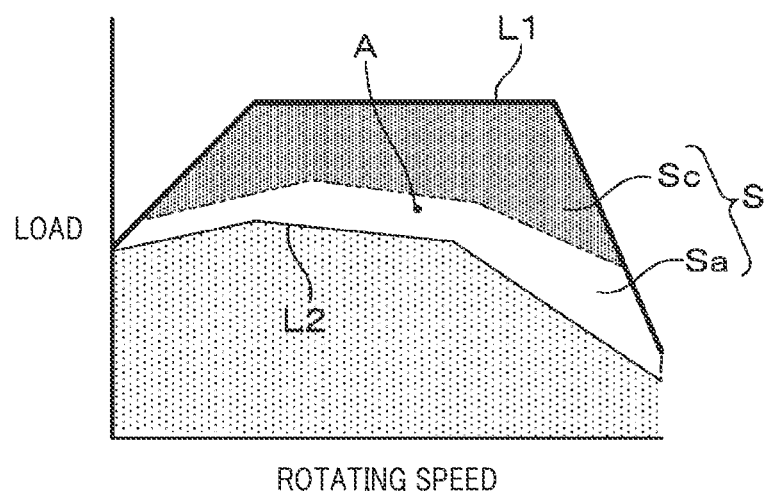
FIG. 8B is a conceptual diagram indicating a correspondence relationship among a load, rotation speed and an ignition energy profile in a second modified example.

Note that the point A as an operating condition for setting data such as the shape of the accessory chamber 21, and the radius and arrangement of the injection holes 22 can be set appropriately in view of a type of the engine and other conditions, and, for example, as in a first modified example illustrated in FIG. 8A, the point A may be set at a position close to the reference L1 indicating the upper limit of the engine operating region. In this case, the high-load region S where knocking can occur is substantially constituted with the first high-load region Sa and the second high-load region Sb. Further, as in a second modified example illustrated in FIG. 8B, the point A may be set at a position close to the reference L2 for occurrence of knocking. In this case, the high-load region S is substantially constituted with the first high-load area Sa and the third high-load region Sc. In either modified example, by the ignition energy control unit 53 controlling the ignition energy to be supplied to the ignition plug 2 based on the map indicating the correspondence relationship among the load, the rotation speed and the ignition energy profile illustrated in FIG. 5B in a similar manner to a case of the first embodiment, operational effects similar to those in the first embodiment can be provided.

(Evaluation Test)

In the first embodiment, an evaluation test regarding a relationship between the ignition energy to be supplied to the ignition plug 2 and injection of flame was performed. The ignition energy to be supplied to the ignition plug 2 for a test object was respectively set at 25 mJ, 50 mJ and 100 mJ at the ignition device 1 in the first embodiment in test examples 1 to 3. In an evaluation method, a state of injection of flame at a time point at which 4.5 ms has elapsed since start of discharge was simulated based on hydromechanics.

According to the present evaluation test, as illustrated in FIG. 9A to FIG. 9C, it was confirmed that a length of the flame becomes longer, and injection speed of the flame becomes higher in accordance with increase in the ignition energy to be supplied to the ignition plug 2.

As described above, according to the present embodiment, it is possible to provide the ignition device 1 which can achieve improvement in fuel efficiency.

Second Embodiment

Figure 10:
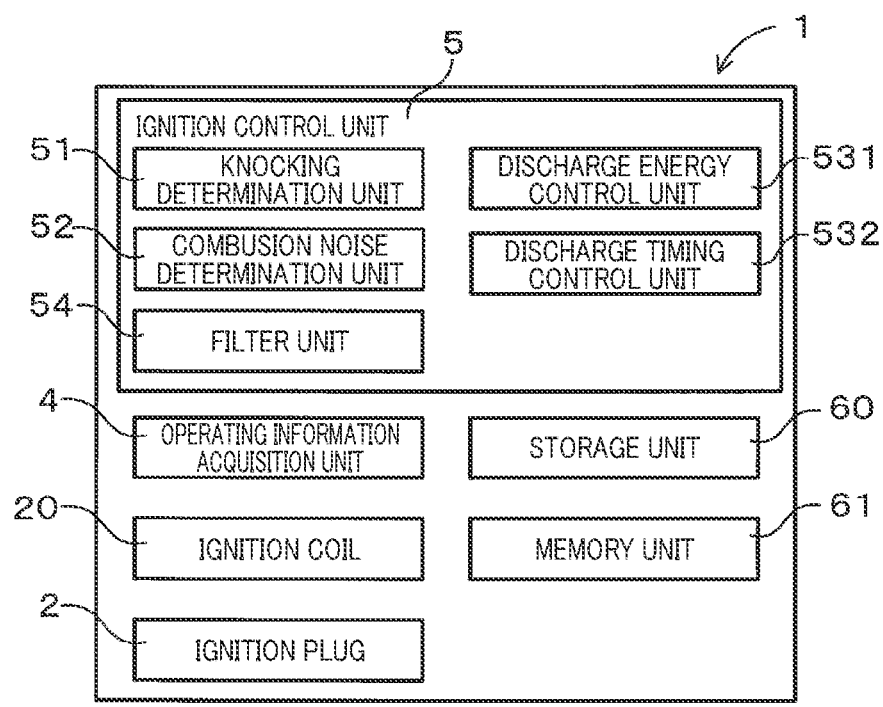
FIG. 10 is a block diagram illustrating a configuration of an ignition device in a second embodiment.

In the second embodiment, as illustrated in FIG. 10, the ignition control unit 5 includes a filter unit 54. The filter unit 54 includes a high-frequency filter and converts a waveform of pressure change within the main combustion chamber 3 acquired by the operating information acquisition unit 4 to derive a specific waveform. Then, the knocking determination unit 51 and the combustion noise determination unit 52 perform respective determination based on the specific waveform.

Further, in the second embodiment, a discharge energy control unit 531 and a discharge timing control unit 532 are provided as illustrated in FIG. 10 in place of the ignition energy control unit 53 in the first embodiment. The discharge energy control unit 531 controls discharge energy at the ignition coil 20. The discharge timing control unit 532 controls the igniter 23 at the ignition coil 20 to control a discharge timing. The ignition energy to be supplied to the ignition plug 2 is controlled by control of both the discharge energy and the discharge timing by the discharge energy control unit 531 and the discharge timing control unit 532. Other components are similar to those in a case of the first embodiment, and thus, the same reference numerals as those in the first embodiment will be used in a case of the present embodiment, and description thereof will be omitted.

Figure 11A:
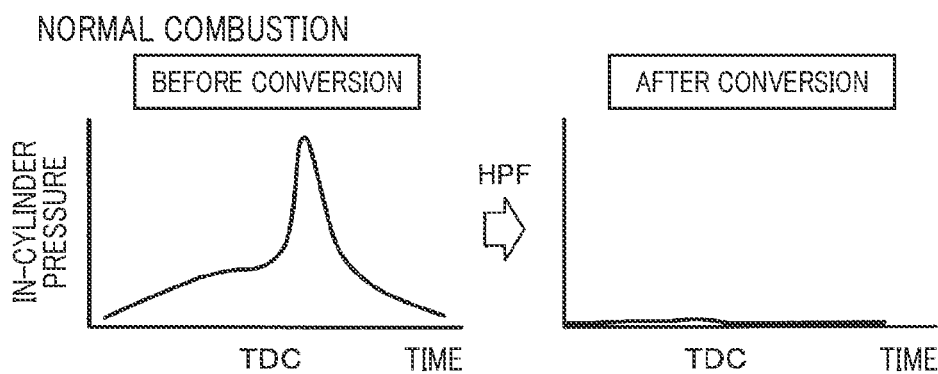
FIG. 11A to FIG. 11C are conceptual diagrams illustrating waveforms before and after conversion in the second embodiment.
Figure 11B:
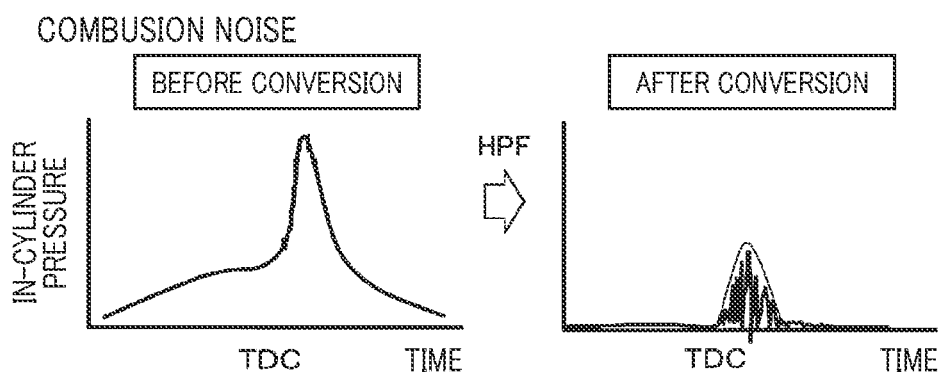
Figure 11C:
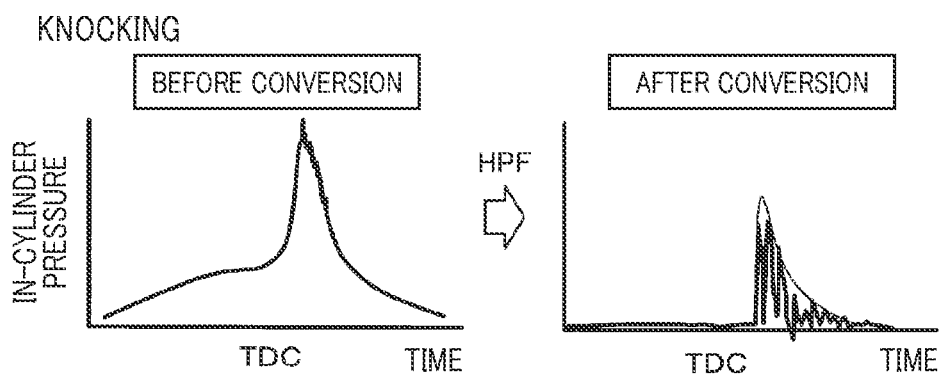

In the second embodiment, the filter unit 54 converts the waveform as illustrated in FIG. 11A to FIG. 11C. Note that in the present embodiment, the filter unit 54 includes a high-pass filter of 5 kHz. FIG. 11A to FIG. 11C all illustrate waveforms before and after conversion by the filter unit 54 with respect to an in-cylinder pressure, FIG. 11A illustrates a case of normal combustion, FIG. 11B illustrate a case where combustion noise occurs, and FIG. 11C illustrates a case where knocking occurs. As illustrated in FIG. 11A, in a case of normal combustion, a peak of the waveform becomes extremely small after filter conversion. On the other hand, as illustrated in FIG. 11B, in a case where combustion noise occurs, a peak of the waveform can be easily recognized after filter conversion, and the peak has a bilaterally symmetric shape with relatively rapid rise and fall. Further, as illustrated in FIG. 11C, in a case where knocking occurs, a peak of the waveform after filter conversion can be easily recognized, and the peak has a bilaterally asymmetric shape with rapid rise and relatively gentle fall. In this manner, conversion of the waveform by the filter unit 54 can make it easy to distinguish a case where combustion noise occurs and a case where knocking occurs from a case of normal combustion.

In the present embodiment, the operating information acquisition unit 4 detects pressure change of the main combustion chamber 3, and the ignition control unit 5 controls the ignition energy profile based on the pressure change acquired by the operating information acquisition unit 4, and thus, knocking or combustion noise can be detected in real time, so that it is possible to improve robustness with respect to change of a situation. Note that in the second embodiment, operational effects similar to those in the first embodiment are provided.

Figure 12A:
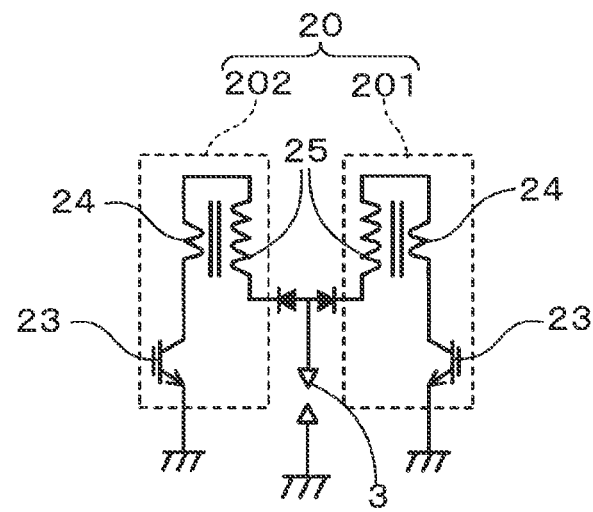
FIG. 12A is a conceptual diagram illustrating a configuration of an ignition coil in a third modified example.
Figure 12B:
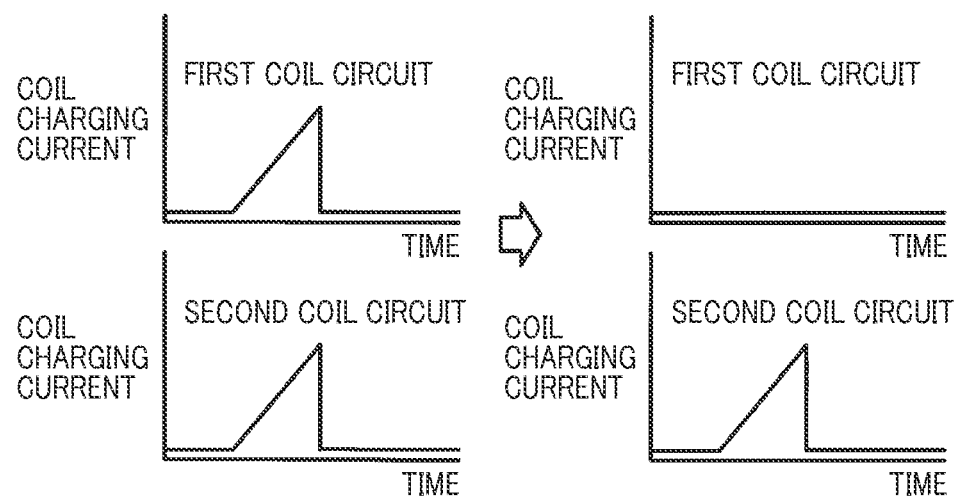
FIG. 12B is a conceptual diagram illustrating a control aspect of an ignition energy profile in the third modified example.

Note that as in a third modified example illustrated in FIG. 12A, in a case where the ignition coil 20 includes a first coil circuit 201 and a second coil circuit 202 and both are connected in parallel to each other, the ignition energy can be controlled by switching a circuit to be used. By switching a state from a state where the first coil circuit 201 and the second coil circuit 202 are energized to a state where the first coil circuit 201 is not energized as illustrated in FIG. 12B, the ignition energy can be reduced, and by switching the state to a state where the both circuits are energized, the ignition energy can be increased.

Figure 13A:
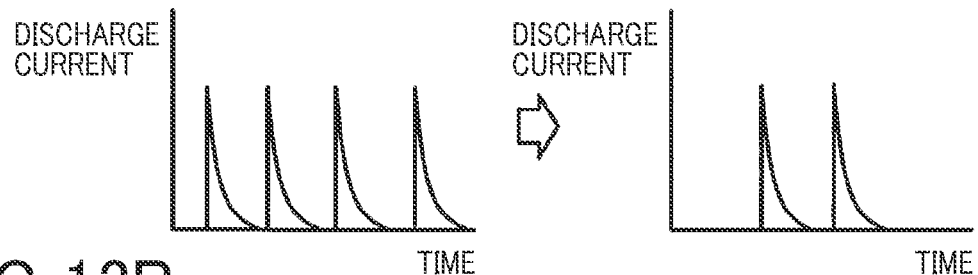
FIG. 13A is a conceptual diagram illustrating a control aspect of an ignition energy profile in a fourth modified example.

Further, as in a fourth modified example illustrated in FIG. 13A, in a case where ignition is performed by the ignition plug 2 performing discharge a plurality of times to sequentially supply discharge energy, the ignition energy can be reduced by controlling the number of times of discharge so as to reduce the number of times of discharge as illustrated in FIG. 13A, and the ignition energy can be increased by controlling the number of times of discharge so as to increase the number of times of discharge while not illustrated.

Figure 13B:
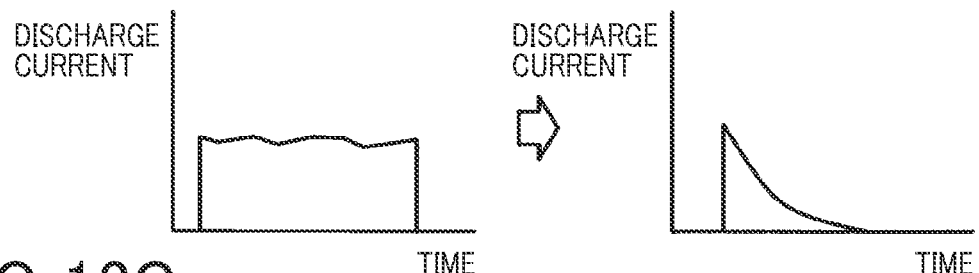
FIG. 13B is a conceptual diagram illustrating a control aspect of an ignition energy profile in a fifth modified example.

Further, as in a fifth modified example illustrated in FIG. 13B, the ignition energy can be reduced by controlling a discharge current at the ignition plug 2 so as to attenuate the discharge current as illustrated in FIG. 13B, and the ignition energy can be increased by controlling the discharge current so as to amplify the discharge current while not illustrated.

Figure 13C:
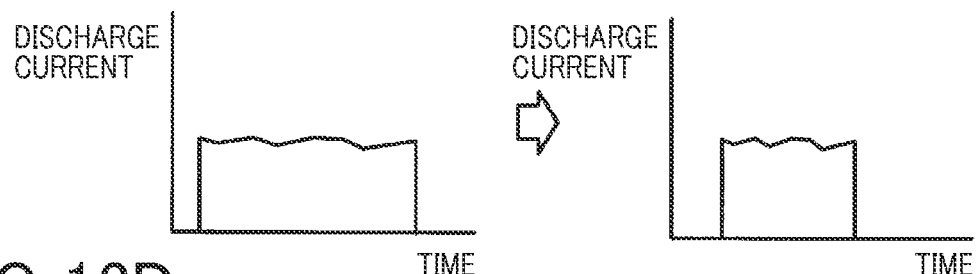
FIG. 13C is a conceptual diagram illustrating a control aspect of an ignition energy profile in a sixth modified example.

Further, as in a sixth modified example illustrated in FIG. 13C, the ignition energy can be reduced by controlling a discharge period at the ignition plug 2 so as to shorten the discharge period at the ignition plug 2 as illustrated in FIG. 13C, and the ignition energy can be increased by controlling the discharge period so as to amplify the discharge period at the ignition plug 2 while not illustrated.

Figure 13D:
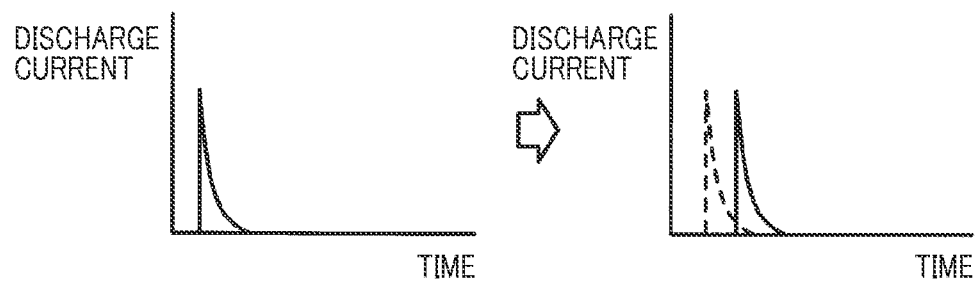
FIG. 13D is a conceptual diagram illustrating a control aspect of an ignition energy profile in a seventh modified example.

Further, as in a seventh modified example illustrated in FIG. 13D, the ignition energy can be reduced by controlling a discharge timing from the ignition coil 20 to the ignition plug 2 so as to delay the discharge timing as illustrated in FIG. 13D.

In all of the third to the seventh modified examples described above, operational effects equivalent to those in the first and the second embodiments can be provided.

Note that in the first embodiment described above, in a case where the load belongs to the second high-load region Sb lower than the first high-load region Sa as the target load illustrated in FIG. 5A, the supplied energy is increased, while in a case where the load belongs to a load range higher than the first high-load region Sa, the supplied energy is decreased. In this control, in a case where it is determined that the knocking occurrence condition is satisfied, the energy supplied to the ignition plug is increased. However, control to increase the energy supplied to the ignition plug in a case where it is determined that the knocking occurrence condition is satisfied does not have to be performed along with control of the energy supplied to the ignition plug in the high-load region in the first embodiment, and control of the energy supplied to the ignition plug may be simply performed in a case where it is determined that the knocking occurrence condition is satisfied.

The present disclosure is not limited to the above-described respective embodiments and modified examples and can be applied to various embodiments within a scope not deviating from the gist of the present disclosure.

While the present disclosure has been described with reference to the embodiments, it is understood that the present disclosure is not limited to the embodiments and structures. The present disclosure incorporates various modified examples and modifications within an equivalent range. In addition, various combinations, forms, and other combinations and forms including only one element or more or less elements fall within the scope and the scope of mind of the present disclosure.

What is claimed is:

1. An ignition device for an internal combustion, the ignition device comprising:
an ignition plug including an accessory chamber and an injection hole from which flame is to be injected from the accessory chamber to a main combustion chamber;
an operating information acquisition unit configured to acquire operating information regarding an operating state of the internal combustion; and
an ignition control unit configured to control an ignition energy profile that affects an ignition state of an air-fuel mixture based on the operating information acquired by the operating information acquisition unit,
wherein the ignition control unit is configured to:
compare a predetermined target load with a load acquired by the operating information acquisition unit,
decrease ignition energy to be supplied to the ignition plug, in response to a result of the comparison indicating that the acquired load is higher than the target load, and
increase ignition energy to be supplied to the ignition plug, in response to the result of the comparison indicating that the acquired load is lower than the target load.

2. The ignition device according to claim 1,
wherein the ignition control unit is configured to:
determine whether a knocking occurrence condition is satisfied, and
increase ignition energy to be supplied to the ignition plug, in response to determining that the knocking occurrence condition is satisfied.

3. The ignition device according to claim 1,
wherein the ignition control unit is configured to:
determine whether the operating state satisfies a knocking occurrence condition,
determine whether it is possible to prevent knocking by increasing ignition energy to be supplied to the ignition plug, in response to determining that the knocking occurrence condition is satisfied, and
retard an ignition timing, in response to determining that it is not possible to prevent the knocking.

4. The ignition device according to claim 1,
wherein the ignition energy profile includes ignition energy to be supplied to the ignition plug.

5. The ignition device according to claim 1,
wherein the operating information includes at least one of a load or rotation speed in the internal combustion.

6. The ignition device according to claim 1,
wherein the ignition control unit is configured to:
determine whether pressure oscillation occurring in association with injection of flame from the injection hole satisfies a combustion noise occurrence condition, and
decrease ignition energy to be supplied to the ignition plug, in response to determining that the combustion noise occurrence condition is satisfied.

7. The ignition device according to claim 1,
wherein the operating information acquisition unit is configured to detect pressure change of the main combustion chamber, and
the ignition control unit is configured to control the ignition energy profile based on the pressure change acquired by the operating information acquisition unit.

8. An ignition device for an internal combustion, the ignition device comprising:
an ignition plug including an accessory chamber and an injection hole from which flame is to be injected from the accessory chamber to a main combustion chamber;
an operating information acquisition unit configured to acquire operating information regarding an operating state of the internal combustion; and
an ignition control unit configured to control an ignition energy profile that affects an ignition state of an air-fuel mixture based on the operating information acquired by the operating information acquisition unit,
wherein the ignition control unit is configured to:
determine whether a knocking occurrence condition is satisfied, and
increase ignition energy to be supplied to the ignition plug, in response to determining that the knocking occurrence condition is satisfied.

9. The ignition device according to claim 8,
wherein the ignition control unit is configured to:
determine whether the operating state satisfies a knocking occurrence condition,
determine whether it is possible to prevent knocking by increasing ignition energy to be supplied to the ignition plug, in response to determining that the knocking occurrence condition is satisfied, and
retard an ignition timing, in response to determining that it is not possible to prevent the knocking.

10. The ignition device according to claim 8,
wherein the ignition energy profile includes ignition energy to be supplied to the ignition plug.

11. The ignition device according to claim 8,
wherein the operating information includes at least one of a load or rotation speed in the internal combustion.

12. The ignition device according to claim 8,
wherein the ignition control unit is configured to:
determine whether pressure oscillation occurring in association with injection of flame from the injection hole satisfies a combustion noise occurrence condition, and
decrease ignition energy to be supplied to the ignition plug, in response to determining that the combustion noise occurrence condition is satisfied.

13. The ignition device according to claim 8,
wherein the operating information acquisition unit is configured to detect pressure change of the main combustion chamber, and
the ignition control unit is configured to control the ignition energy profile based on the pressure change acquired by the operating information acquisition unit.

14. An ignition device for an internal combustion, the ignition device comprising:
an ignition plug including an accessory chamber and an injection hole from which flame is to be injected from the accessory chamber to a main combustion chamber;
an operating information acquisition unit configured to acquire operating information regarding an operating state of the internal combustion; and
an ignition control unit configured to control an ignition energy profile that affects an ignition state of an air-fuel mixture based on the operating information acquired by the operating information acquisition unit,
wherein the ignition control unit is configured to:
determine whether the operating state satisfies a knocking occurrence condition,
determine whether it is possible to prevent knocking by increasing ignition energy to be supplied to the ignition plug, in response to determining that the knocking occurrence condition is satisfied, and
retard an ignition timing, in response to determining that it is not possible to prevent the knocking.

15. The ignition device according to claim 14,
wherein the ignition energy profile includes ignition energy to be supplied to the ignition plug.

16. The ignition device according to claim 14,
wherein the operating information includes at least one of a load or rotation speed in the internal combustion.

17. The ignition device according to claim 14,
wherein the ignition control unit is configured to:
determine whether pressure oscillation occurring in association with injection of flame from the injection hole satisfies a combustion noise occurrence condition, and
decrease ignition energy to be supplied to the ignition plug, in response to determining that the combustion noise occurrence condition is satisfied.

18. The ignition device according to claim 14,
wherein the operating information acquisition unit is configured to detect pressure change of the main combustion chamber, and
the ignition control unit is configured to control the ignition energy profile based on the pressure change acquired by the operating information acquisition unit.

* * * * *